US 11,884,426 B2

(12) United States Patent
Poteet et al.

(10) Patent No.: US 11,884,426 B2
(45) Date of Patent: Jan. 30, 2024

(54) COMPRESSION APPARATUS AND METHODS OF MAKING AND USING THE SAME

(71) Applicant: Hamilton Sundstrand Corporation, Charlotte, NC (US)

(72) Inventors: Steven Poteet, Ashland, MA (US); Timothy R. Boysen, Simsbury, CT (US); Blair A. Smith, South Windsor, CT (US); Jorge Ramon Mesa, League City, TX (US); Brian K. Orwig, El Lago, TX (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 663 days.

(21) Appl. No.: 16/923,519

(22) Filed: Jul. 8, 2020

(65) Prior Publication Data
US 2022/0009654 A1    Jan. 13, 2022

(51) Int. Cl.
*B30B 9/04* (2006.01)
*B64G 1/60* (2006.01)
*B30B 9/30* (2006.01)
*B30B 15/06* (2006.01)

(52) U.S. Cl.
CPC .............. *B64G 1/60* (2013.01); *B30B 9/04* (2013.01); *B30B 9/3021* (2013.01); *B30B 15/062* (2013.01)

(58) Field of Classification Search
CPC ......... B30B 9/04; B30B 9/3021; B30B 15/34; B30B 15/062; B64G 1/60
See application file for complete search history.

(56) References Cited

U.S. PATENT DOCUMENTS

| 9,530,624 B2 | 12/2016 | Gebeshuber et al. |
| 2003/0042294 A1* | 3/2003 | Matsumoto ............ B21D 22/10 228/115 |
| 2006/0221540 A1* | 10/2006 | Himori ............. H01J 37/32568 361/234 |
| 2011/0089097 A1* | 4/2011 | O'Reilly .................. B30B 9/06 210/225 |

(Continued)

FOREIGN PATENT DOCUMENTS

| CN | 105378415 A | * | 3/2016 | .......... B30B 11/002 |
| DE | 19810969 A1 | | 9/1999 | |

(Continued)

OTHER PUBLICATIONS

The Extended European Search Report for Application No. 21184469. 1-1017; Report dated Nov. 15, 2021; 10 pages.

*Primary Examiner* — Jimmy T Nguyen
(74) *Attorney, Agent, or Firm* — CANTOR COLBURN LLP

(57) ABSTRACT

A compression apparatus includes an outer shell; a first plate and second plate, where the first plate and the second plate are located within the outer shell and a face of the first plate opposes a face of the second plate The compression apparatus also includes a compression mechanism which retractably moves the face of the second plate into contact with the face of the first plate. The face of the first plate or the face of the second plate includes a substrate layer, and a coating layer over the substrate layer, where the coating layer includes a plasma-enhanced chemical vapor deposition material.

17 Claims, 4 Drawing Sheets

(56) References Cited

U.S. PATENT DOCUMENTS

| | | | |
|---|---|---|---|
| 2012/0240796 A1* | 9/2012 | Zimmerman, II | B30B 9/3014 |
| | | | 100/215 |
| 2018/0297310 A1 | 10/2018 | Evans et al. | |
| 2018/0318900 A1 | 11/2018 | Shiroishi et al. | |
| 2018/0354218 A1 | 12/2018 | Stapleton | |
| 2019/0047242 A1 | 2/2019 | Lutzer et al. | |
| 2019/0131149 A1* | 5/2019 | Fu | H01L 21/68 |

FOREIGN PATENT DOCUMENTS

| | | | | |
|---|---|---|---|---|
| DE | 102005009298 A1 | 9/2006 | | |
| EP | 0847850 A1 | 6/1998 | | |
| EP | 2233281 A1 | 9/2010 | | |
| KR | 101954850 B1 * | 3/2019 | | H05H 1/46 |

* cited by examiner

COMPRESSION APPARATUS AND METHODS OF MAKING AND USING THE SAME

BACKGROUND

Exemplary embodiments pertain to the art of waste material compression and, more particularly, a compression apparatus which is located aboard a spacecraft.

Aircraft and/or spacecraft such as those used for the transport of passengers, for example, the International Space Station, process and dispose of waste materials produced by said passengers. Waste materials can include, for example, organic food materials, scrap plastics, and used clothing. The processing of said waste materials can include the use of a compression apparatus, or more particularly, a waste compactor. During compression within the apparatus, high temperatures and pressures are developed on internal compressive surfaces.

Therefore, there is a need to develop an improved compression apparatus for use aboard a spacecraft and for the compression of waste material.

BRIEF DESCRIPTION

Disclosed is a compression apparatus, comprising: an outer shell; a first plate and second plate, wherein the first plate and the second plate are located within the outer shell, wherein a face of the first plate opposes a face of the second plate; and a compression mechanism which retractably moves the face of the second plate into contact with the face of the first plate; wherein the face of the first plate or the face of the second plate comprises a substrate layer, and a coating layer over the substrate layer, wherein the coating layer comprises a plasma-enhanced chemical vapor deposition material.

Also disclosed is a method of fabricating the compression apparatus, the method comprising: fabricating the outer shell; fabricating the compression mechanism; coating the substrate layer(s) with the coating layer(s) via plasma-enhanced chemical vapor deposition material to form the first plate and the second plate; and configuring, within the outer shell, the face of the first plate to oppose the face of the second plate, and the compression mechanism to be in mechanical communication with the second plate.

Also disclosed is a method of compressing waste materials using the compression apparatus, the method comprising: depositing waste materials within the outer shell and between the face of the first plate and the face of the second plate; and activating the compression mechanism which moves the face of the second plate toward the face of the first plate, compressing the waste materials; wherein a surface temperature at the face of the first plate, the face of the second plate, or a combination thereof, is about 205° C. to about 345° C.; wherein a surface pressure at the face of the first plate, the face of the second plate, or a combination thereof, is about 170 kilopascal to about 690 kilopascal; and wherein the face of the first plate, the face of the second plate, or a combination thereof, maintains a solid phase during compression of the waste materials.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed coating and method are presented herein by way of exemplification and not limitation with reference to the Figures.

Figure 1:
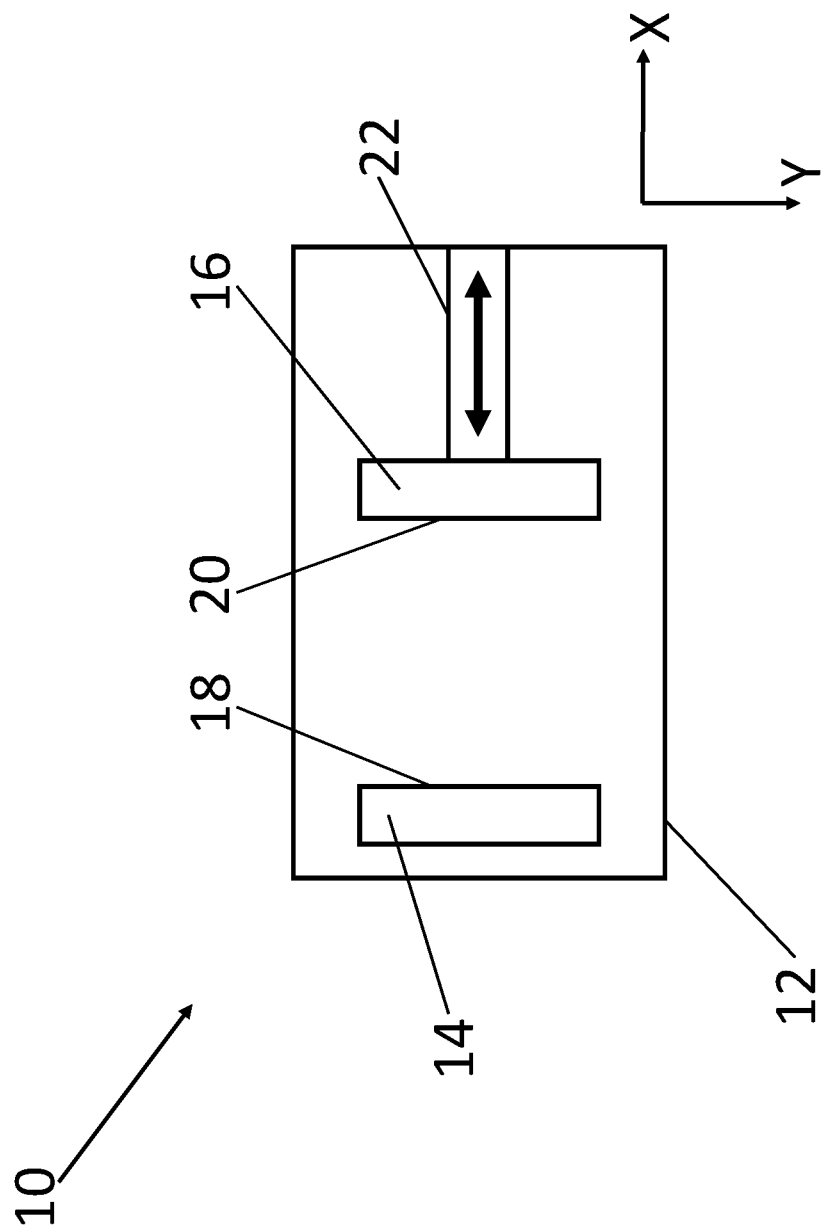
FIG. 1 is a simplified schematic diagram of a compression apparatus according to an exemplary embodiment.

Referring to FIG. 1, a compression apparatus 10 can be, for example, a waste compactor. The compression apparatus 10 can be located in a microgravity environment, located aboard a spacecraft, or a combination thereof.

In an embodiment, an outer shell 12 of the compression apparatus 10 can comprise stainless steel, nickel alloy, titanium alloy, or a combination thereof. An atmospheric pressure within the outer shell 12 can be about 1.75 kilopascal to about 100 kilopascal (about 0.25 pound per square inch to about 14.7 pounds per square inch).

In an embodiment, a first plate 14 and second plate 16 can be located within the outer shell 12. A face 18 of the first plate 14 can oppose a face 20 of the second plate 16. A surface temperature at the face 18 of the first plate 14, the face 20 of the second plate 16, or a combination thereof, can be about 205° C. to about 345° C. (about 400° F. to about 650° F.). A surface pressure at the face 18 of the first plate 14, the face 20 of the second plate 16, or a combination thereof, can be about 170 kilopascal to about 690 kilopascal (about 25 pound per square inch to about 100 pounds per square inch), for example, about 240 kilopascal to about 380 kilopascal (about 35 pound per square inch to about 55 pounds per square inch), for example, about 276 kilopascal to about 345 kilopascal (about 40 pound per square inch to about 50 pounds per square inch).

In an embodiment, a compression mechanism 22 of the compression apparatus 10 can retractably move (in the X direction) the face 20 of the second plate 16 into contact with the face 18 of the first plate 14, thereby compressing waste material between the first plate 14 and the second plate 16. The compression mechanism 22 can be any mechanical means of compression, for example, a jackscrew in mechanical communication with the second plate 16. A jackscrew can be operated by, for example, turning a leadscrew.

During compression within a waste material compression apparatus, high temperatures and pressures are developed on internal compressive surfaces. It has now been unexpectedly discovered that these internal surfaces, when coated with typical nickel or nickel-phosphorus plating with additional co-deposited, infused, or top coated polytetrafluoroethylene (Teflon), undergo a phase change from solid to non-solid. And as a result, the waste materials being compressed problematically adhere to these internal surfaces, thus necessitating expensive and time-consuming maintenance. The efficiency of the compactor is also reduced. The inventive solution disclosed herein includes the use of plasma-enhanced chemical vapor deposition material, for example diamond-like carbon, as a coating for the internal surfaces (i.e., the face 18 and the face 20) of the compactor. This improved coating resists phase change from solid to nonsolid, or in other words, maintains a solid phase, even when under high surface temperatures and pressures within the waste compactor, and even when located in a microgravity environment. This improved coating can last, for example, greater than or equal to 5 years being used once per 12-hour cycle.

Figure 2:
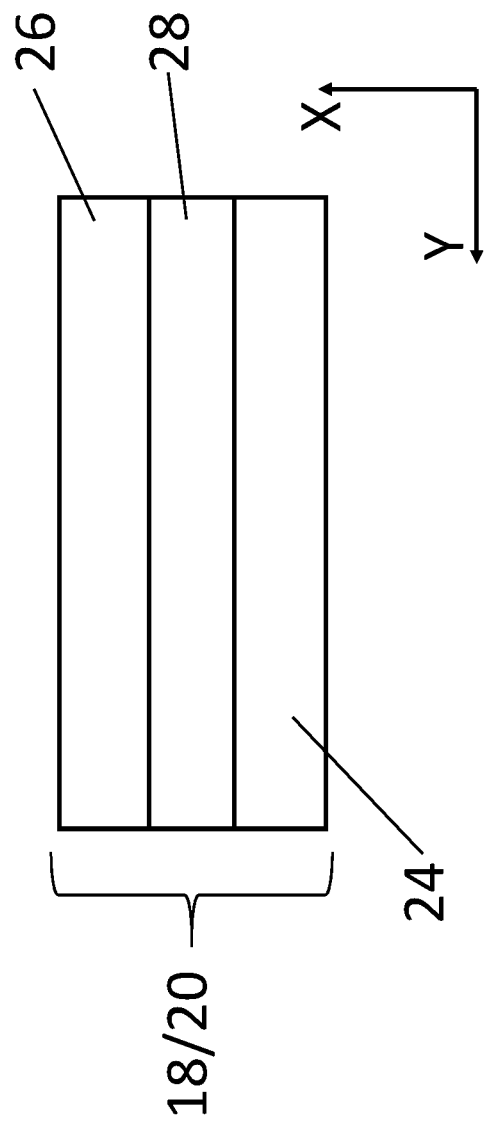
FIG. 2 is a cross-section of a face of a first plate according to an exemplary embodiment.

Referring now to FIG. 2, the face 18 of the first plate 14 or the face 20 of the second plate 16 can comprise a substrate layer 24, and a coating layer 26 over the substrate layer. In an embodiment, both the face 18 of the first plate 14 and the face 20 of the second plate 16 can comprise a substrate layer 24 and a coating layer 26.

In an embodiment, the substrate layer 24 comprises stainless steel, nickel alloy, titanium alloy, or a combination thereof.

In an embodiment, the coating layer 26 can comprise a plasma-enhanced chemical vapor deposition material. Plasma-enhanced chemical vapor deposition is a chemical vapor deposition process used to deposit thin films from a gas state (vapor) to a solid state on a substrate. Chemical reactions are involved in the process, which occur after creation of a plasma of the reacting gases. The plasma can be created by radio frequency (RF), alternating current (AC) frequency, direct current (DC), or discharge between two electrodes, the space between which is filled with the reacting gases.

In an embodiment, the plasma-enhanced chemical vapor deposition material can comprise diamond-like carbon. Diamond-like carbon (DLC) is a class of amorphous carbon material that displays properties of diamond.

In an embodiment, a thickness (in the X direction) of the coating layer 26 can be about 2.5 micrometer to about 50 micrometers. The coating layer 26 can be chemically inert to acids, bases, or a combination thereof. A contact angle of the coating layer 26 can be about 70 degrees to about 80 degrees. The contact angle is a measure of the wettability of a solid by a liquid. A high contact-angle values show the surface's tendency to repel a liquid. ISO 19403-2:2017 specifies a test method to measure the contact angle for the determination of the surface free energy of a solid surface. The method can be applied for the characterization of substrates and coatings.

In an embodiment, the ratio of hybridized $sp^3$ carbon to graphitic $sp^2$ carbon in the diamond-like carbon can be about 20:1 to about 3:1. A higher amount of hybridized $sp^3$ carbon can increase the density of the diamond-like carbon. The diamond-like carbon can further comprise a silicon additive. In an embodiment, the coating layer 26 does not comprise polytetrafluoroethylene (Teflon).

In an embodiment, there can further be an intermediary layer 28 located between the substrate layer 24 and the coating layer 26. The intermediary layer 28 can comprise nitrides of chromium, aluminum, titanium, or any combinations thereof. A thickness (in the X direction) of the intermediary layer 28 can be about 0.1 micrometers to about 5 micrometers (about 3.9 microinches to about 196.9 microinches), for example, about 0.1 micrometers to about 2 micrometers (about 3.9 microinches to about 78.7 microinches).

Figure 3:
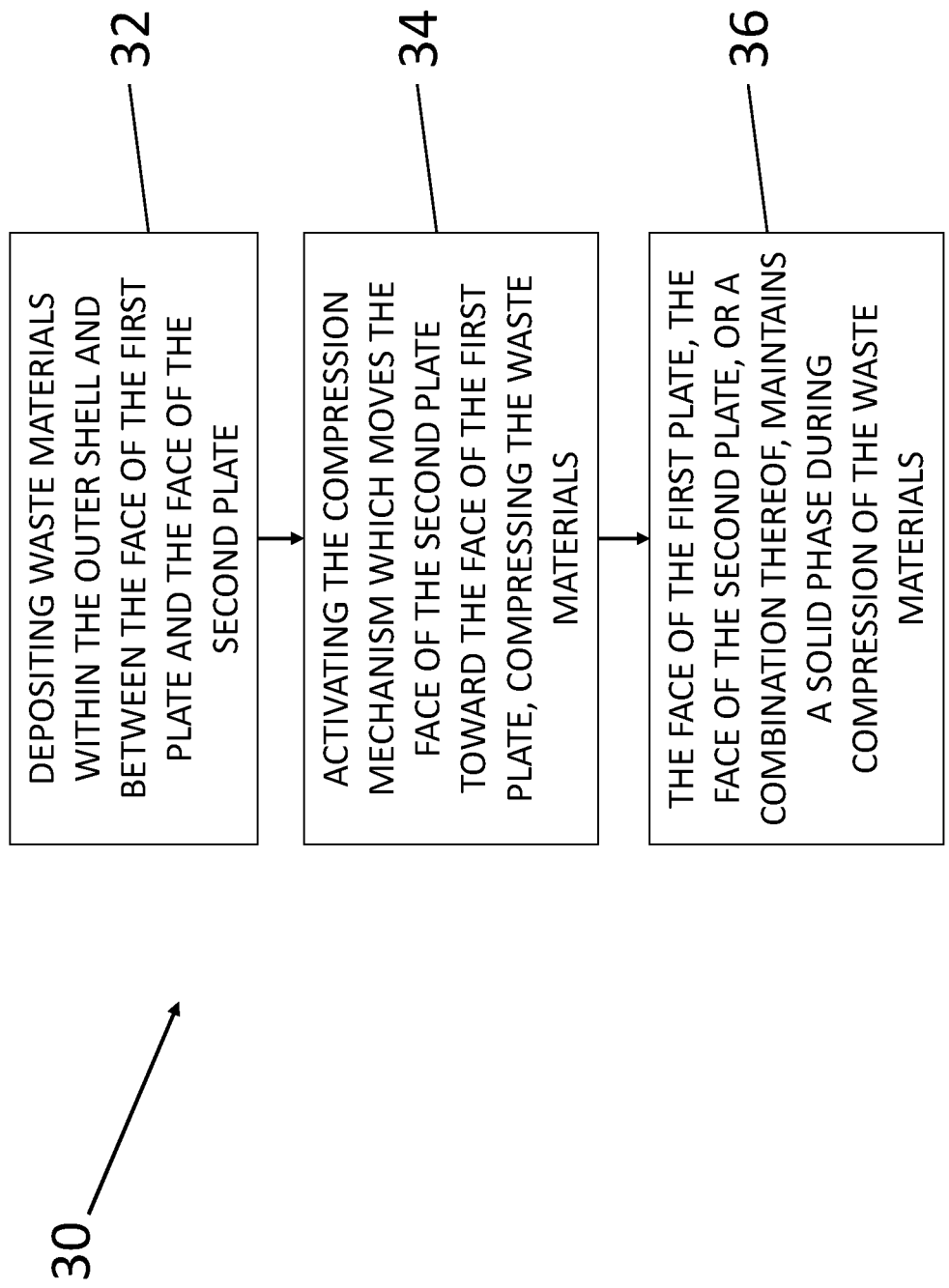
FIG. 3 is a flow diagram representing a method of compressing waste materials according to an exemplary embodiment.

Now referring to FIG. 3, a method 30 of compressing waste materials using the compression apparatus 10 can comprise step 32: depositing waste materials within the outer shell 12 and between the face 18 of the first plate 14 and the face 20 of the second plate 16. The method 30 can further comprise step 34: activating the compression mechanism which moves the face 20 of the second plate 16 toward the face 18 of the first plate 14, compressing the waste materials.

In an embodiment, a surface temperature at the face 18 of the first plate 14, the face 20 of the second plate 16, or a combination thereof, can be about 205° C. to about 345° C. (about 400° F. to about 650° F.).

In an embodiment, a surface pressure at the face 18 of the first plate 14, the face 20 of the second plate 16, or a combination thereof, can be about 170 kilopascal to about 690 kilopascal (about 25 pound per square inch to about 100 pounds per square inch), for example, about 240 kilopascal to about 380 kilopascal (about 35 pound per square inch to about 55 pounds per square inch), for example, about 276 kilopascal to about 345 kilopascal (about 40 pound per square inch to about 50 pounds per square inch).

The method 30 can further comprise step 36: the face 18 of the first plate 14, the face 20 of the second plate 16, or a combination thereof, maintains a solid phase during compression of the waste materials.

Figure 4:
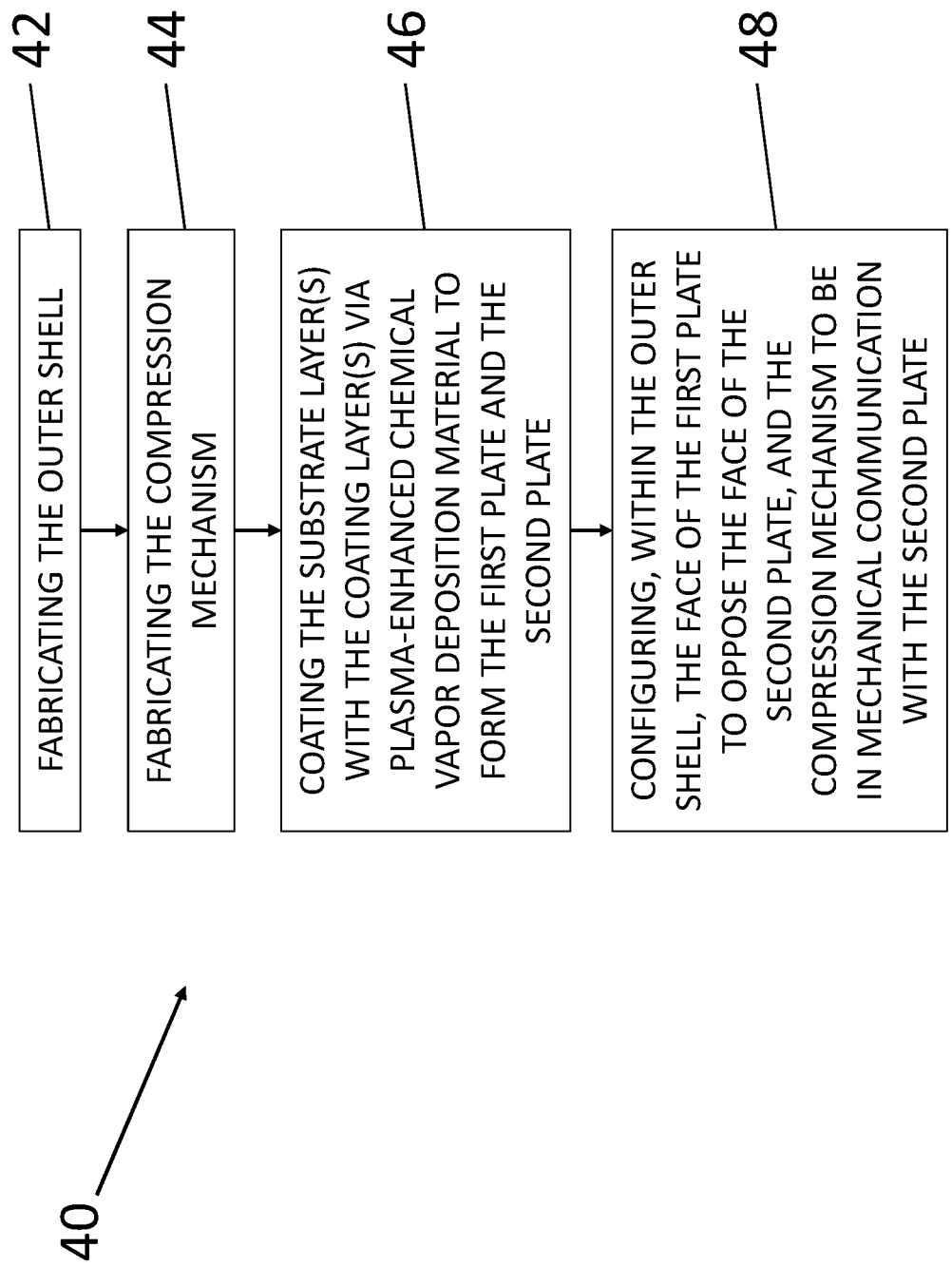
FIG. 4 is a flow diagram representing a method of fabricating a compression apparatus according to an exemplary embodiment.

Now referring to FIG. 4, method 40 of fabricating the compression apparatus 10 can comprise step 42: fabricating the outer shell 12. The method 40 can further comprise step 44: fabricating the compression mechanism. The method 40 can further comprise step 46: coating the substrate layer(s) with the coating layer(s) via plasma-enhanced chemical vapor deposition material to form the first plate and the second plate. The method 40 can further comprise step 48: configuring, within the outer shell, the face of the first plate to oppose the face of the second plate, and the compression mechanism to be in mechanical communication with the second plate.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components (and encompasses "consist(s) of", "consisting of", "consist(s) essentially of" and "consisting essentially of"), but do not necessarily preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A compression apparatus, comprising:
    an outer shell;

a first plate and a second plate, wherein the first plate and the second plate are located within the outer shell, wherein a face of the first plate opposes a face of the second plate; and a compression mechanism which retractably moves the face of the second plate into contact with the face of the first plate;

wherein the face of the first plate or the face of the second plate comprises:

a substrate layer, a coating layer over the substrate layer, wherein the coating layer comprises a plasma-enhanced chemical vapor deposition material, and a contact angle of the coating layer is at least about 70 degrees, and an intermediary layer located between the substrate layer and the coating layer, wherein the intermediary layer comprises nitrides of chromium, aluminum, titanium, or any combinations thereof.

2. The compression apparatus of claim 1, wherein the outer shell comprises stainless steel, nickel alloy, titanium alloy, or a combination thereof.

3. The compression apparatus of claim 1, wherein the compression mechanism is a jackscrew in mechanical communication with the second plate.

4. The compression apparatus of claim 1, wherein both the face of the first plate and the face of the second plate comprise a substrate layer and a coating layer.

5. The compression apparatus of claim 1, wherein the substrate layer comprises stainless steel, titanium alloy, or a combination thereof.

6. The compression apparatus of claim 1, wherein the plasma-enhanced chemical vapor deposition material comprises diamond-like carbon.

7. The compression apparatus of claim 1, wherein a thickness of the coating layer is about 2.5 micrometer to about 50 micrometers.

8. The compression apparatus of claim 1, wherein a surface temperature at the face of the first plate, the face of the second plate, or a combination thereof, is about 205° C. to about 345° C.

9. The compression apparatus of claim 1, wherein a surface pressure at the face of the first plate, the face of the second plate, or a combination thereof, is about 170 kilopascal to about 690 kilopascal.

10. The compression apparatus of claim 1, wherein the coating layer is chemically inert to acids, bases, or a combination thereof.

11. The compression apparatus of claim 6, wherein the ratio of hybridized $sp^3$ carbon to graphitic $sp^2$ carbon in the diamond-like carbon is about 20:1 to about 3:1.

12. The compression apparatus of claim 6, wherein the diamond-like carbon further comprises a silicon additive.

13. The compression apparatus of claim 1, wherein the coating layer does not comprise polytetrafluoroethylene.

14. The compression apparatus of claim 1, wherein an atmospheric pressure within the outer shell is about 1.75 kilopascal to about 100 kilopascal.

15. The compression apparatus of claim 1, wherein the contact angle of the coating layer is about 70 degrees to about 80 degrees.

16. The compression apparatus of claim 15, wherein a thickness of the intermediary layer is about 0.1 micrometers to about 5 micrometers.

17. The compression apparatus of claim 1, wherein the compression apparatus is a waste compactor, wherein the compression apparatus is located in a microgravity environment, located aboard a spacecraft, or a combination thereof.

* * * * *